(12) United States Patent
Miyazaki (10) Patent No.: US 7,883,159 B2
(45) Date of Patent: Feb. 8, 2011

(54) BRAKE CONTROL APPARATUS AND BRAKE CONTROL METHOD

(75) Inventor: Tetsuya Miyazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1036 days.

(21) Appl. No.: 11/626,599

(22) Filed: Jan. 24, 2007

(65) Prior Publication Data

US 2007/0194623 A1 Aug. 23, 2007

(30) Foreign Application Priority Data

Feb. 23, 2006 (JP) ............................. 2006-047011

(51) Int. Cl.
*B60T 8/32* (2006.01)
(52) U.S. Cl. ............... 303/191; 303/122.03; 188/79.52; 188/1.11 E
(58) Field of Classification Search ............ 303/122.03, 303/122.05, 122.08, 191, 155; 188/79.51, 188/79.52, 1.11 R, 1.11 E
See application file for complete search history.

(56) References Cited

U.S. PATENT DOCUMENTS

| 5,524,974 | A | * | 6/1996 | Fischle et al. ............... 303/191 |
| 5,671,981 | A | * | 9/1997 | Sasaki et al. ............ 303/122.06 |
| 5,731,975 | A | * | 3/1998 | Nakashima .................. 701/83 |
| 5,757,641 | A | * | 5/1998 | Minto ........................... 700/4 |
| 6,345,225 | B1 | | 2/2002 | Böhm et al. |
| 2004/0212251 | A1 | * | 10/2004 | Kinder et al. ............... 303/191 |
| 2005/0092556 | A1 | * | 5/2005 | Schoppa ................. 188/1.11 R |

FOREIGN PATENT DOCUMENTS

| DE | 198 32 167 A 1 | 5/1999 |
| DE | 199 43 352 A 1 | 4/2001 |
| JP | 3-7644 | 1/1991 |
| JP | 5-92760 | 4/1993 |
| JP | 5-229414 | 9/1993 |
| JP | 7-156780 | 6/1995 |
| JP | 9-193765 | 7/1997 |
| JP | 11-72129 | 3/1999 |
| JP | 11-152024 | 6/1999 |
| JP | 2000-326838 | 11/2000 |
| JP | 2001-343036 | 12/2001 |
| JP | 2002-193090 | 7/2002 |
| JP | 2003-104186 | 4/2003 |
| JP | 2004-122819 | 4/2004 |
| JP | 2004-268703 | 9/2004 |
| JP | 2004-284507 | 10/2004 |
| JP | 2005-119343 | 5/2005 |

\* cited by examiner

*Primary Examiner*—Xuan Lan Nguyen
(74) *Attorney, Agent, or Firm*—Oblon, Spivak, McClelland, Maier & Neustadt, L.L.P.

(57) ABSTRACT

A brake control apparatus comprises: a braking force applying mechanism that brakes a wheel by pressing a friction member upon supply of a working fluid; and a control portion that computes a target value set for controlling the pressure of the working fluid by utilizing a detected temperature of the friction member so as to restrain fluctuations of the effect of the brake caused by temperature changes of the friction member. The control portion restricts the utilization of the detected temperature in the computation of the target value in case a decline of the detection accuracy of the friction member temperature is predicted to restrain the influence of the decline of the estimation accuracy of the friction member temperature on the braking force control.

20 Claims, 7 Drawing Sheets

BRAKE CONTROL APPARATUS AND BRAKE CONTROL METHOD

INCORPORATION BY REFERENCE

The disclosure of Japanese Patent Application No. 2006-047011 filed on Feb. 23, 2006 including the specification, drawings and abstract is incorporated herein by reference in its entirety.

BACKGROUND OF THE INVENTION

1. Field of the Invention

The invention relates to a brake control apparatus for a vehicle and a brake control method, that control the braking force applied to wheels provided on the vehicle.

2. Description of the Related Art

A wheel slip control apparatus that performs a brake control for restraining a drive wheel slip during acceleration of the vehicle, on the basis of the estimated temperature of a brake pad estimated by a brake pad temperature estimation device has been known (e.g., see Japanese Patent Application Publication No. JP-A-7-156780). In the brake pad temperature estimation, the temperature gains of the brake pad caused at the time of braking and at the time of brake control, and the temperature decline caused when neither the braking nor the brake control is performed are worked out. From the temperature gains and the temperature decline, the temperature of the brake pad is estimated.

In addition, an electrical control apparatus that determines a friction coefficient between a pad and a rotor following continuous changes of the temperature detected by temperature detection means, and that determines a target value of the brake oil pressure on the basis of the friction coefficient and the pedal depression force has been known (e.g., see Japanese Patent Application Publication No. JP-A-5-92760). Furthermore, a vehicular brake apparatus that performs a control such that the pressure of a working fluid supplied from an air tank to a brake main body upon output from a temperature sensor that detects a change in the surface temperature of friction members of the brake main body is corrected in accordance with changes in the friction coefficient of the friction members of the brake main body is known (e.g., see Japanese Patent Application Publication No. JP-A-3-7644).

Since the temperature of a friction member and the friction coefficient has a certain relationship, the braking force generated by friction fluctuates in accordance with the temperature of the friction member. Therefore, adjustment of braking force in accordance with the temperature of a friction member has been performed in the related art. Hence, in the case where an estimated value of the temperature of a friction member of a brake is used, the estimation accuracy of the temperature may decline due to occurrence of an abnormality, external disturbance, etc. If the estimation accuracy declines, there is a likelihood of the estimated temperature deviating from the actual temperature of a friction member. If the estimated temperature deviates from the actual temperature of the friction member, it becomes difficult to sufficiently restrain the fluctuations of the braking force which are caused by temperature changes of the friction member.

SUMMARY OF THE INVENTION

Accordingly, it is an object of the invention to provide a brake control apparatus for a vehicle and a brake control method, capable of restraining the influence that a decline of the estimation accuracy of the friction member temperature has on the braking force control, and further stabilizing the effectiveness of the brake.

A vehicle brake control apparatus in accordance with a first aspect of the invention, comprises: a braking force applying mechanism that brakes a wheel by pressurizing a friction member; and a control portion that computes a target value set for controlling a pressurizing force of a friction member through a utilization of a detected temperature of the friction member. The control portion predicts an accuracy of detection of the temperature of the friction member based on vehicular operational information and/or vehicular environmental information associated with the temperature of the friction member, and restricts the utilization of the detected temperature in computing the target value if a decline of accuracy of detection of the friction member temperature is predicted.

According to the first aspect of the invention, the brake control apparatus comprises a braking force applying mechanism that brakes a wheel by pressurizing a friction member, and a control portion that computes a target value set for controlling a pressurizing force of a friction member, such as a target pressure, a target deceleration, etc., through utilization of a detected, e.g. estimated, measured, or otherwise suitably obtained, temperature of the friction member. By utilizing the detected temperature of the friction member in computation of the target value, it becomes possible to restrain the fluctuations of the effect of the brake which occur due to temperature changes of the friction member. As the fluctuation of the effect of the brake is restrained, the unpleasant sensation associated with the temperature change of the friction member at the time of braking can be lessened.

At this time, the control portion predicts the accuracy of detection of the detected temperature of the friction member on the basis of suitable information or factors relating to the temperature of the friction member and restricts the utilization of the detected temperature in the computation of the target value if a decline of the accuracy in detecting the friction member temperature is predicted. Even if the accuracy detection declines so that the detected temperature deviates from the actual temperature of the friction member, the restriction of the utilization of the detected temperature will lessen the influence of the detected temperature on results of computation of the target value. Therefore, it becomes possible to restrain the influence of decline of the accuracy of detection on the braking force control, so that the effectiveness of the brake can be further stabilized. Incidentally, the vehicular operational information and/or the vehicular environmental information associated with the temperature of the friction member may include abnormalities in sensors, operation state of a parking brake, elapsed time following the latest stop of a driving source, vehicle deceleration, wheel speed, weather information, and so on.

Incidentally, the friction member temperature can be estimated by, for example, using an initial temperature value of the friction member, a temperature gain computed on the basis of the friction heat generated by braking, and a cooling temperature loss computed on the basis of the temperature difference from the outside air temperature.

Furthermore, the control portion may compute a corrected target value by correcting an uncorrected target value computed without utilizing the detected temperature, in accordance with the detected temperature, and may control the pressurizing force of the friction member by using the corrected target value if a decline of accuracy in detecting the temperature of the friction member is not predicted, and the control portion may control the pressurizing force of the friction member by using the uncorrected target value instead of the corrected target value if a decline of accuracy in detecting the temperature of the friction member is predicted.

According to the above aspect, the uncorrected target value is computed without utilizing the detected temperature of the friction member, and the corrected target value is computed by correcting the uncorrected target value in accordance with the detected temperature. The control portion controls the pressurizing force of the friction member normally by using the corrected target value. However, in a case where there is predicted to be a decline of the accuracy of detection of the friction member temperature, the control portion controls the pressurizing force of the friction member by using the uncorrected target value instead of the corrected target value. Therefore, in the case where the estimation accuracy is good, it is possible to restrain the fluctuations of the braking force caused by temperature changes of the friction member by using the corrected target value. In the case where there is predicted to be a decline of the accuracy of detection, the utilization of the estimated temperature is stopped, and the uncorrected target value is used instead of the corrected target value. Thus, since a more appropriate target value can be used in accordance with the accuracy of detection of the friction member temperature, the braking force can be more appropriately controlled.

At this time, when using the uncorrected target value instead of the corrected target value, the control portion may make a gradual switch from the corrected target value to the uncorrected target value. According to this aspect, the control can be gently switched from a temperature-compensated control in which the braking force is controlled by using the corrected target value to a non-temperature-compensated control in which the braking force is controlled by using the uncorrected target value. Hence, the fluctuation of the effect of the brake that can occur at the time of stopping the utilization of the friction member temperature can be alleviated.

A decline of accuracy of detection of the temperature of the friction member be a in case where an initial temperature value acquired when temperature estimation of the friction member is started is predicted to be deviate from an actual friction member temperature. According to this aspect, when the detection of the temperature of the friction member is started, for example, when the vehicle-running drive source is started up, an initial temperature value to be used for the temperature estimation is acquired from an outside air temperature sensor, that is, one of the temperature sensors mounted in the vehicle. For example, in the case where the outside air temperature sensor has an abnormality, or the case where the vehicle-running drive source is started before a sufficient amount of time elapses following the latest stop of driving, or the like, the initial temperature value is predicted to be deviate from the actual friction member temperature. In the case where the initial value to be used in the temperature estimation is apart by at least a predetermined value from the actual friction member temperature, there is predicted to be a decline of the accuracy of detection of the friction member temperature. Hence, by restricting the utilization of the detected temperature in the computation of the target value in the aforementioned case, the control portion is able to easily restrain the influence of decline of the accuracy of detection on the braking force control.

At this time, the control portion may determine whether or not there is predicted to be a deviation of the initial temperature value from the actual friction member temperature by acquiring, as the initial temperature value, a measured value provided by one of at least two temperature sensors mounted in a vehicle, and comparing the initial temperature value and a measured value provided by another one of the temperature sensors. If the difference between the initial temperature value acquired by measurement and the measured value provided by the another one of the temperature sensors is large, the likelihood of the initial temperature value being deviate from the actual friction member temperature is considered to be high. On the other hand, if the difference therebetween is small, the likelihood of the initial temperature value being deviate from the actual friction member temperature is expected to be low. Hence, by comparing the measured values provided by the two temperature sensors, it can be determined whether or not there is predicted to be a deviation of the initial temperature value from the actual friction member temperature. This is preferable also in that a measurement instrument for directly measuring the friction member temperature does not need to be provided but an existing temperature sensor in the vehicle can be used for the determination.

Furthermore, a decline of accuracy in detecting the temperature of the friction member may be in a case where a time-dependent rate of change of the friction member temperature has exceeded a predetermined value. For example, in the case where the friction member is suddenly cooled due to water submergence, strong wind, etc., the time-dependent rate of change of the friction member temperature can become greater than the predetermined value. In such a case, since there is predicted to be a decline of the accuracy of detection of the friction member temperature, the influence of decline of the estimation accuracy on the braking force control can be restrained by restricting the utilization of the detected temperature in the computation of the target value.

At this time, the control portion may determine whether or not the time-dependent rate of change of the friction member temperature has exceeded the predetermined value based on an index that indicates a magnitude of braking force generated by the braking force applying mechanism. If the friction member temperature fluctuates, the friction coefficient of the friction member fluctuates, involving a fluctuation of the index that indicates the magnitude of braking force generated by the braking force applying mechanism, for example, the vehicle deceleration or the like. Hence, from a change in the index that indicates the magnitude of braking force, a change in the friction member temperature can be determined. This is preferable in that the time-dependent rate of change of the friction member temperature can be grasped without providing a measurement instrument for directly measuring the friction member temperature.

Furthermore, a decline of accuracy in detecting the temperature of the friction member may be in a case where an abnormality has occurred in a sensor that provides a measured value that is needed for computing the detected temperature of the friction member. Thus, in the case where an abnormality has occurred in a sensor that provides a measured value needed for the temperature detection, there is also predicted to be a decline of the accuracy of detection; therefore, it is desirable to restrict the utilization of the temperature detection in the computation of the target value.

The control portion, while restricting the utilization of the detected temperature, may determine whether or not an accuracy detection of the temperature has been recovered, and if the control portion determines that the accuracy has been recovered, the control portion may discontinue restricting the utilization of the detected temperature. According to this aspect, while the utilization of the detected temperature is restricted, it is determined whether or not the accuracy of detection of the temperature has been recovered. When the detection accuracy of the friction member temperature has been recovered, the utilization restriction is promptly discontinued. Therefore, it becomes possible to restart the utilization of the detected temperature of the friction member upon recovery of the detection accuracy, and therefore restrain the fluctuations of the effect of the brake that occur due to temperature changes of the friction member.

The control portion, when starting restricting the utilization of the estimated temperature, may start computing a detected temperature from each of two initial temperature values that have a difference that is greater than a recovery criterion value, and may determine that the accuracy of the temperature detection has been recovered when the difference between two detected temperatures derived respectively from the two initial temperature values becomes smaller than the recovery criterion value. The value of the detected temperature is considered to converge, regardless of the initial temperature value, as the computation is repeatedly performed. Hence, it can be determined that the detection accuracy has been recovered, on the ground that the difference between the two detected temperature values has become smaller than the set recovery criterion value.

A method for controlling braking force of a vehicle having a braking force applying mechanism that brakes a wheel by pressurizing a friction member, in accordance with a second aspect of the invention, comprising the steps of: detecting a temperature of the friction member, computing a target value for controlling a pressurizing force of the friction member, on the basis of the detected temperature of the friction member, predicting an accuracy in detecting the temperature of the friction member based on vehicular operational information and/or vehicular environmental information associated with the temperature of the friction member, and restricting the utilization of the detected temperature of the friction member in computing the target value if a decline of accuracy in detecting the temperature of the friction member is predicted.

According to the above aspects of the invention, the influence that a decline of the detection accuracy of the friction member temperature might have on the braking force control can be restrained, and the effectiveness of the brake can be further stabilized.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Preferred embodiments of the invention will be described in detail hereinafter with reference to the drawings.

Figure 1:
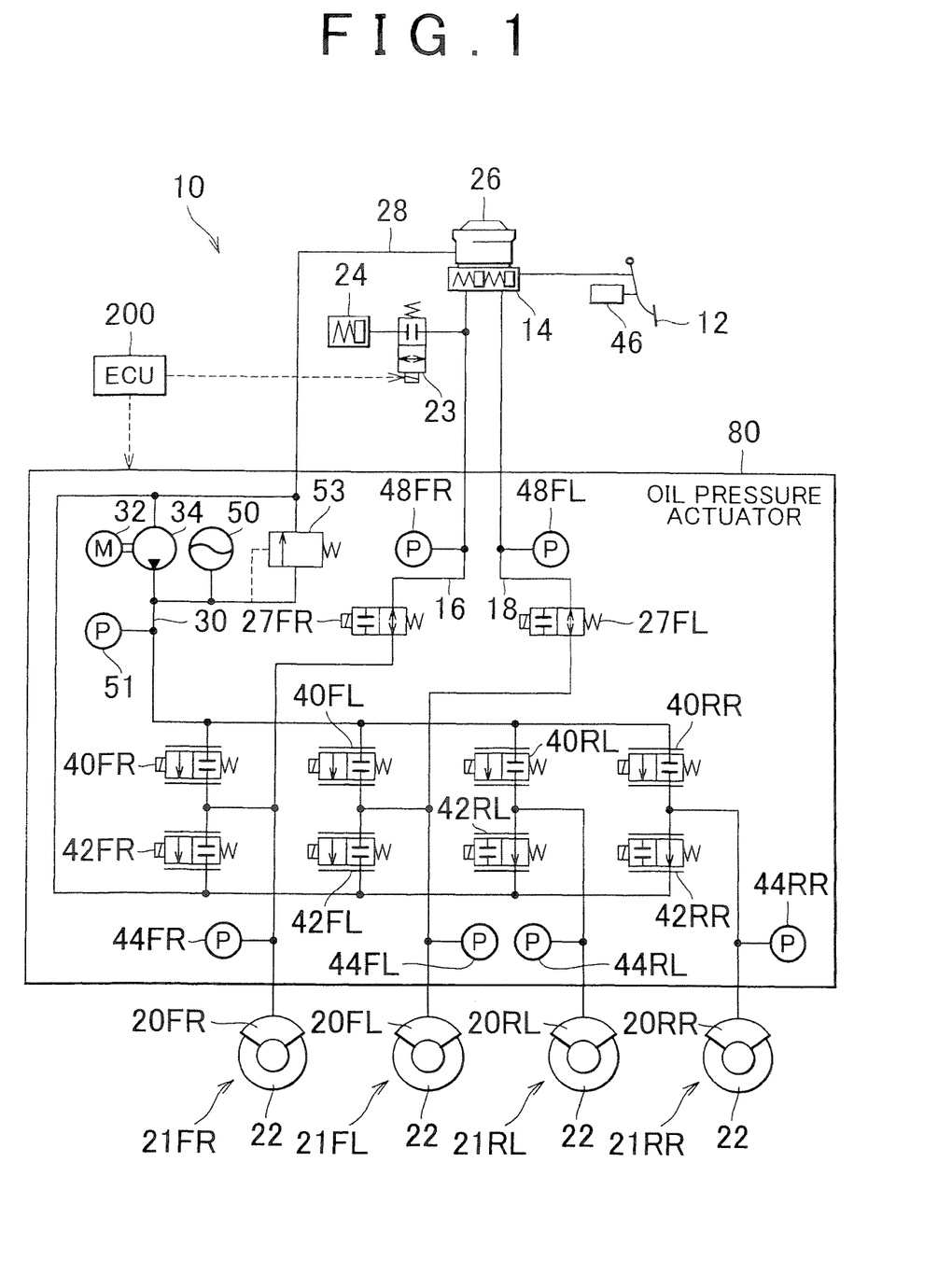
FIG. 1 is a system diagram showing a brake control apparatus in accordance with an embodiment of the invention.

FIG. 1 is a system diagram showing a brake control apparatus 10 in accordance with an embodiment of the invention. The brake control apparatus 10 shown in this diagram constitutes a vehicular electronically-controlled brake system, and independently and optimally sets the brakes of the four road wheels of a vehicle in accordance with the operation performed by a driver on a brake pedal 12 that is provided as a brake operating member. Besides, the vehicle in which the brake control apparatus 10 in accordance with the embodiment is mounted is equipped with a steering apparatus (not shown) that steers the steering road wheels of the four wheels, a vehicle-running drive source (not shown), such as an internal combustion engine, an electric motor, etc., which drives the drive wheels of the four wheels, etc.

Disc brake units 21FR, 21FL, 21RR, 21RL as braking force applying mechanisms apply braking force to a right front wheel, a left front wheel, a right rear wheel, and a left rear wheel of the vehicle, respectively. The disc brake units 21FR to 21RL each include a brake disc 22, and a wheel cylinder 20FR to 20RL, respectively, which is contained in a brake caliper. The wheel cylinders 20FR to 20RL are connected to an oil pressure actuator 80 via different fluid passageways. In the description below, the wheel cylinders 20FR to 20RL will be collectively referred to as "wheel cylinders 20".

As for each of the disc brake units 21FR to 21RL, when brake fluid is supplied to the wheel cylinder 20 from the oil pressure actuator 80, a brake pad as a friction member is pressed against the brake disc 22 that rotates together with the wheel. Thus, braking force is applied to each wheel. Although in this embodiment the disc brake units 21FR to 21RL are used, it is also permissible to use other braking force applying mechanisms that include wheel cylinders 20, for example, drum brakes, and the like. It is also possible to use a braking force applying mechanism that does not utilize the fluid force to control the pressurizing force of the friction members, for example, a mechanism that uses an electric drive mechanism, such as an electric motor or the like, to control the pressurizing force of the friction members against the wheels.

The brake pedal 12 is connected to a master cylinder 14 that sends out brake fluid as a working fluid in accordance with the driver's depressing operation. The brake pedal 12 is provided with a stroke sensor 46 for detecting the depression stroke. A stroke simulator 24 that creates reaction force in accordance with the operating force of the brake pedal 12 caused by the driver is connected to one of output ports of the master cylinder 14. An intermediate portion of a channel connecting the master cylinder 14 and the stroke simulator 24 is provided with a simulator cut valve 23. The simulator cut valve 23 is a normally closed-type electromagnetic open-close valve that is in a closed state when not electrified and that is switched to an open state when the driver's operation of the brake pedal 12 is detected. Furthermore, a reservoir tank 26 for storing the brake fluid is connected to the master cylinder 14.

A right front wheel-purpose brake oil pressure control pipe 16 is connected to another output port of the master cylinder 14. The brake oil pressure control pipe 16 is connected to a right front wheel-purpose wheel cylinder 20FR that applies braking force to the right front wheel (not shown). Furthermore, a left front wheel-purpose brake oil pressure control pipe 18 is connected to still another output port of the master cylinder 14. The brake oil pressure control pipe 18 is connected to a left front wheel-purpose wheel cylinder 20FL that applies braking force to the left front wheel (not shown). An intermediate portion of the right front wheel-purpose brake oil pressure control pipe 16 is provided with a right master cut valve 27FR, and an intermediate portion of the left front wheel-purpose brake oil pressure control pipe 18 is provided with a left master cut valve 27FL. Each of the right master cut valve 27FR and the left master cut valve 27FL is a normally open-type electromagnetic valve that is in an open state when not electrified and that is switched to a closed state when the driver's operation of the brake pedal 12 is detected.

Furthermore, an intermediate portion of the right front wheel-purpose brake oil pressure control pipe 16 is provided with a right master pressure sensor 48FR that detects the right front wheel-side master cylinder pressure. An intermediate portion of the left front wheel-purpose brake oil pressure control pipe 18 is provided with a left master pressure sensor 48FL that detects the left front wheel-side master cylinder pressure. In the brake control apparatus 10, when the brake pedal 12 is depressed by the driver, the depressing operation amount is detected by the stroke sensor 46. The depressing operation amount (depressing force) of the brake pedal 12 can also be determined from the master cylinder pressure detected by the right master pressure sensor 48FR and the left master pressure sensor 48FL. Thus, with the supposition of failure of the stroke sensor 46, the master cylinder pressure is monitored by the two pressure sensor 48FR, 48FL, which is preferable in the light of fail safety. Incidentally, in the description below, the right master pressure sensor 48FR and the left master pressure sensor 48FL are collectively referred to as "master cylinder pressure sensors 48" when appropriate.

An end of an oil pressure supply-discharge pipe 28 is connected to the reservoir tank 26. Another end of the oil pressure supply-discharge pipe 28 is connected to a suction opening an oil pump 34 that is driven by a motor 32. An ejection opening of the oil pump 34 is connected to a high-pressure pipe 30. An accumulator 50 and a relief valve 53 are connected to the high-pressure pipe 30. This embodiment adopts, as the oil pump 34, a reciprocating pump equipped with two or more pistons (not shown) that are individually reciprocated by the motor 32. As the accumulator 50, a one that converts pressure energy of the brake fluid into pressure energy of an enclosed gas of, for example, nitrogen or the like, and stores the converted pressure energy is adopted.

The accumulator 50 stores brake fluid whose pressure is raised to, for example, about 14 to 22 MPa, by the oil pump 34. An ejection opening of the relief valve 53 is connected to the oil pressure supply-discharge pipe 28. If the pressure of brake fluid in the accumulator 50 abnormally rises, for example, to about 25 MPa, the relief valve 53 is opened, so that high-pressure brake fluid is returned into the oil pressure supply-discharge pipe 28. Furthermore, the high-pressure pipe 30 is provided with an accumulator pressure sensor 51 that detects an outlet opening pressure of the accumulator 50, that is, the pressure of brake fluid in the accumulator 50.

The high-pressure pipe 30 is connected to a right front wheel-purpose wheel cylinder 20FR, a left front wheel-purpose wheel cylinder 20FL, a right rear wheel-purpose wheel cylinder 20RR, and a left rear wheel-purpose wheel cylinder 20RL, via pressure-intensifying valves 40FR, 40FL, 40RR, 40RL. Hereinafter, the wheel cylinders 20FR to 20RL will be collectively referred to as "wheel cylinders 20" when appropriate, and the pressure-intensifying valves 40FR to 40RL will be collectively referred to as "pressure-intensifying valves 40" when appropriate. Each of the pressure-intensifying valves 40 is a normally closed-type electromagnetic flow control valve (linear valve) that is in a closed state when not electrified and that is utilized for intensifying the pressure in the wheel cylinder 20 in accordance with need.

The right front wheel-purpose wheel cylinder 20FR and the left front wheel-purpose wheel cylinder 20FL are connected to the oil pressure supply-discharge pipe 28 via pressure-reducing valves 42FR, 42FL, respectively. Each of the pressure-reducing valves 42FR, 42FL is a normally closed-type electromagnetic flow control valve (linear valve) that is utilized for reducing the pressure in a corresponding one of the wheel cylinders 20FR, 20FL. On the other hand, the right rear wheel-purpose wheel cylinder 20RR and the left rear wheel-purpose wheel cylinder 20RL are connected to the oil pressure supply-discharge pipe 28 via pressure-reducing valves 42RR, 42RL, respectively, which are normally open-type electromagnetic flow control valves. Hereinafter, the pressure-reducing valves 42FR to 42RL will be collectively referred to as "pressure-reducing valves 42".

Provided near the right front wheel-purpose, left front wheel-purpose, right rear wheel-purpose, and left rear wheel-purpose wheel cylinders 20FR to 20RL are wheel cylinder pressure sensors 44FR, 44FL, 44RR, 44RL that each detect the wheel cylinder pressure, that is, brake fluid pressure, that acts on a corresponding one of the wheel cylinders 20. Hereinafter, the wheel cylinder pressure sensors 44FR to 44RL will be collectively referred to as "wheel cylinder pressure sensors 44" when appropriate.

The right master cut valve 27FR, the left master cut valve 27FL, the pressure-intensifying valves 40FR to 40RL, the pressure-reducing valves 42FR to 42RL, the oil pump 34, the accumulator 50, etc. which are described above constitute the oil pressure actuator 80 of the brake control apparatus 10. The oil pressure actuator 80 is controlled by an electronic control unit (hereinafter, referred to as "ECU") 200 as a control portion in this embodiment. The ECU 200 is equipped with a CPU that executes various computation processes, a ROM that stores various control programs, a RAM utilized as work areas for storing data and executing programs, input/output interfaces, a memory, etc.

Figure 2:
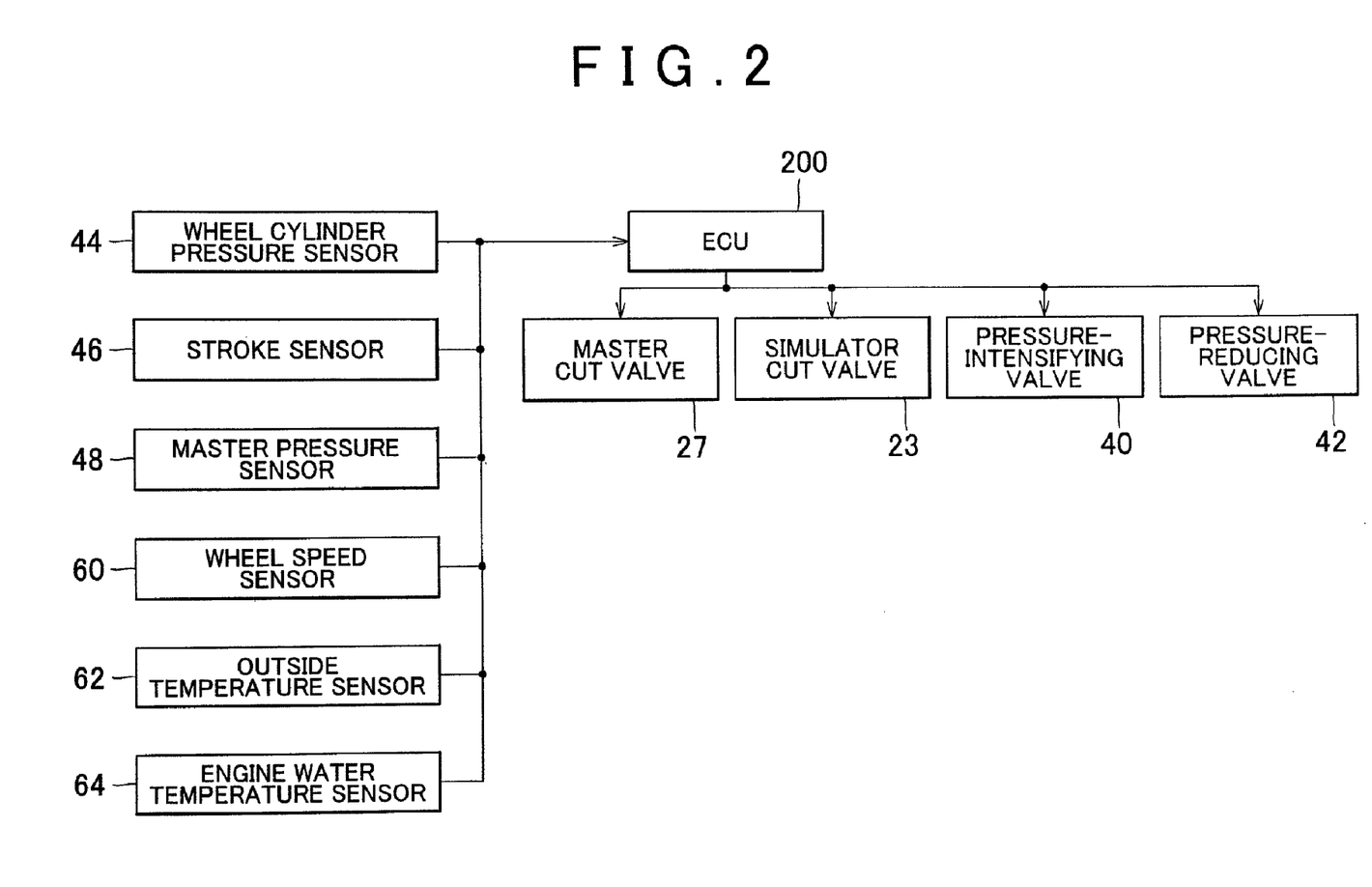
FIG. 2 is a control block diagram in accordance with the embodiment.

FIG. 2 is a control block diagram in accordance with the embodiment. The master cut valves 27FR, 27FL, the simulator cut valve 23, the pressure-intensifying valves 40FR to 40RL, the pressure-reducing valves 42FR to 42RL, etc., are electrically connected to the ECU 200. Besides, signals indicating the wheel cylinder pressures of the wheel cylinders 20FR to 20RL are given to the ECU 200 from the wheel cylinder pressure sensors 44FR to 44RL. Other signals are also given to the ECU 200, that is, a signal indicating the pedal stroke of the brake pedal 12 is given from the stroke sensor 46, signals indicating the master cylinder pressure are given from the right master pressure sensor 48FR and the left master pressure sensor 48FL, and a signal indicating accumulator pressure is given from the accumulator pressure sensor 51.

Furthermore, a wheel speed sensor 60 is electrically connected to the ECU 200, and gives thereto signals indicating the wheel speeds. Still further, a plurality of temperature sensors are electrically connected to the ECU 200, including an outside air temperature sensor 62, an engine water temperature sensor 64, an intake air temperature sensor (not shown), etc. The outside air temperature sensor 62 is provided as a component of an air-conditioning appliance for adjusting the temperature inside the vehicle, and gives a signal indicating the temperature outside the vehicle to the ECU 200. The engine water temperature sensor 64 gives the ECU 200 a signal indicating the temperature of the cooling water that cools the engine provided for running the vehicle.

In the brake control apparatus 10 constructed as described above, the ECU 200 successively sets a target deceleration of the vehicle in every computation cycle on the basis of the depression stroke of the brake pedal 12 and the master cylinder pressure, and successively sets a target hydraulic pressure of each wheel cylinder 20 in accordance with the target deceleration. Then, each pressure-intensifying valves 40 and each pressure-reducing valve 42 are controlled by the ECU 200 so that the corresponding wheel cylinder pressure follows its target hydraulic pressure. In consequence, the brake pads are pressed against the brake discs 22 so that each wheel is given a braking force that corresponds to the target deceleration.

At this time, the master cut valves 27FR, 27FL are in the closed state, and the simulator cut valve 23 is in the open state. Therefore, the brake fluid sent out from the master cylinder 14 due to the driver's depression of the brake pedal 12 flows into the stroke simulator 24 through the simulator cut valve 23.

Incidentally, due to friction heat generated by the friction between the brake disc 22 and the brake pad of each wheel cylinder 20, the temperature of the brake pad may temporarily rise during braking. There is a certain relationship between the temperature of the brake pad and its friction coefficient, and the friction coefficient of the brake pad changes as the temperature of the brake pad rises. A change in the friction coefficient causes a change in the braking force, thus fluctuating the effect of the brake.

Therefore, the ECU 200 estimates the temperature of each brake pad, and utilizes the estimated temperature to compute the target hydraulic pressure. This makes it possible to restrain the fluctuations of the effect of the brake caused by temperature changes of the brake pad. Since the brake pad temperature is not directly measured but is estimated, there is no need to provide a temperature sensor for measuring the brake pad temperature, which is preferable in that the cost for providing temperature sensors reduces.

Concretely, the ECU 200 corrects the target hydraulic pressure by multiplying the target hydraulic pressure by a temperature correction coefficient that is in accordance with the estimated temperature of the brake pad. In the ECU 200, a relationship between the estimated temperature of the brake pad and the temperature correction coefficient is set and stored beforehand. The ECU 200 may compensate for changes in the effect of the brake depending on temperature fluctuations by multiplying the target deceleration by a temperature correction coefficient, or may use other techniques to reflect a temperature change in the target value. Hereinafter, controlling the braking force so as to restrain fluctuations of the effect of the brake caused by temperature changes of the brake pad will be termed brake temperature-compensated control, and controlling the braking force without utilizing the temperature of the brake pad will be termed non-temperature-compensated control.

Figure 3:
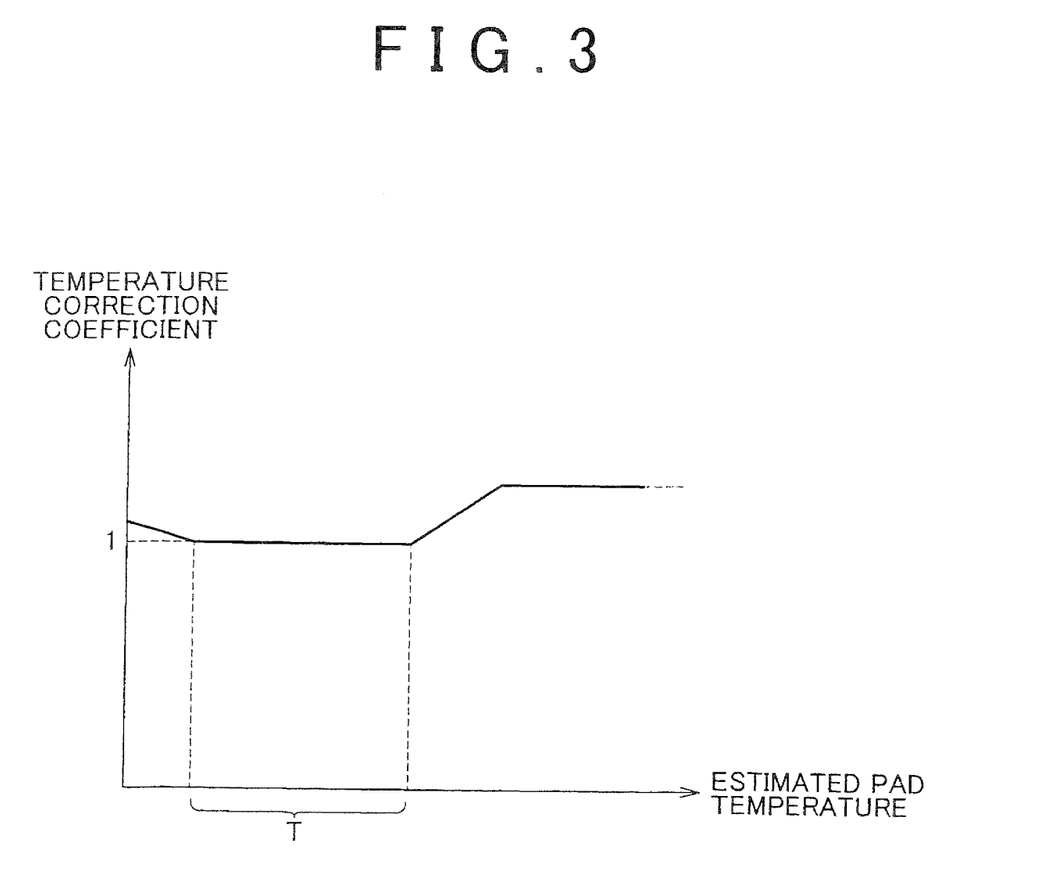
FIG. 3 is a diagram showing an example of a relationship between an estimated temperature of a brake pad and the temperature correction coefficient in accordance with the embodiment.

FIG. 3 is a diagram showing an example of a relationship between the estimated temperature of the brake pad and the temperature correction coefficient in accordance with the embodiment. In FIG. 3, the vertical axis represents the temperature correction coefficient, and the horizontal axis represents the estimated temperature of the brake pad. As shown in FIG. 3, the temperature correction coefficient is set at "1" in a predetermined temperature region T that includes the normal temperature. Therefore, if the estimated temperature value computed by the ECU 200 is included in the temperature region T, the uncorrected target hydraulic pressure computed from the target deceleration irrespective of the estimated temperature of the brake pad and the corrected target hydraulic pressure obtained through multiplication by the temperature correction coefficient become equal.

As for temperature values outside the temperature region T, setting is made such that the temperature correction coefficient gently progressively becomes larger than 1 as the temperature value become farther apart from the temperature region T. Therefore, if the estimated temperature value computed is not included in the temperature region T, the ECU 200 corrects the target hydraulic pressure so that the effect of the brake is enhanced by the temperature correction coefficient that is in accordance with the estimated temperature value. Incidentally, if the temperature value is greater than the temperature region T, the temperature correction coefficient is set at a maximum value. Therefore, after the temperature correction coefficient reaches this maximum value as the temperature value rises, the temperature correction coefficient remains at a uniform value that is equal to the maximum value.

In this embodiment, the ECU 200 computes an estimated temperature by adding the amount of temperature change between the computation cycles to the latest estimated temperature of the brake pad. The amount of temperature change is given by subtracting the cooling temperature loss from the temperature gain between computation cycles. The temperature gain is computed from the measured values from the wheel speed sensor 60 and the like by a known technique in which the temperature gain is estimated from the energy released due to the friction, and the cooling temperature loss is computed from the temperature measured by the outside air temperature sensor 62 or the like by a known technique. When the ECU 200 begins the temperature estimation of the brake pad, such as when the vehicle-running drive source is started, or the like, an initial temperature value that is appropriately acquired is used instead of the latest estimated temperature.

However, it can happen that the estimation accuracy of the brake pad temperature declines due to, for example, occurrence of abnormality, external disturbance, etc. If the estimation accuracy declines, there arises a risk of the estimated temperature deviating from the actual temperature of the friction member. There is also a possibility of the estimated temperature fluctuating to greater extents than the actual temperature of the friction member. Hence, there is a possibility that it will become difficult to stabilize the effectiveness of the brake by restraining the fluctuations in the braking force due to the temperature changes of the brake pad.

Therefore, in the embodiment, the ECU 200 normally executes the temperature-compensated control, and if it is predicted that the estimation accuracy of the brake pad temperature will decline, the ECU 200 gently switches the control to the non-temperature-compensated control. That is, normally, the ECU 200 computes a corrected target pressure by correcting the uncorrected target pressure computed without utilizing the estimated temperature, in accordance with the estimated temperature, and uses the corrected target pressure to control the wheel cylinder pressure. However, if it is predicted that the estimation accuracy of temperature will decline, the ECU 200 uses the uncorrected target pressure instead of the corrected target pressure to control the wheel cylinder pressure. At this time, the ECU 200 makes a gradual switch from the corrected target pressure to the uncorrected target pressure by using an intermediate target value that is set between the corrected target pressure and the uncorrected target pressure. In this manner, if it is predicted that the estimation accuracy of brake pad temperature will decline, the utilization of the estimated temperature in the computation of a target hydraulic pressure is restricted.

Figure 4:
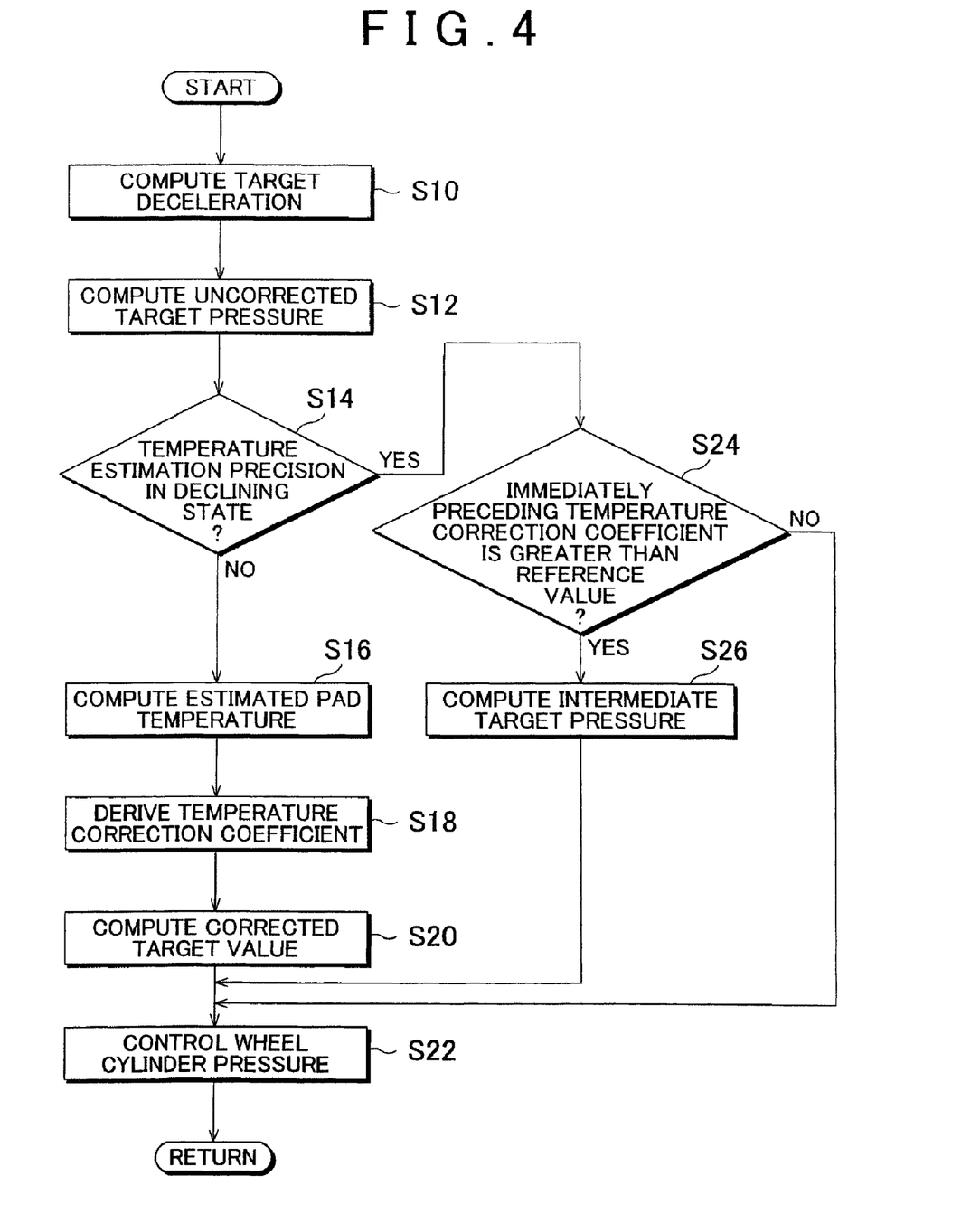
FIG. 4 is a flowchart for describing a control process for the wheel cylinder pressure in the embodiment.

FIG. 4 is a flowchart for describing a control process for the wheel cylinder pressure in the embodiment. The process shown in FIG. 4 is executed on a predetermined cycle, for example, every several milliseconds, to control the wheel cylinder pressure. As shown in FIG. 4, when the process is started in response to generation of a braking request, the ECU 200 first computes a target deceleration of the vehicle on the basis of the depression stroke of the brake pedal 12 and the master cylinder pressure (S10). After computing the target deceleration, the ECU 200 computes an uncorrected target pressure without using the brake pad temperature (S12).

Then, the ECU 200 determines whether or not the present state is a state where there is predicted to be a decline of the estimation accuracy of the brake pad temperature (S14). Hereinafter, the state where there is predicted to be a decline of the estimation accuracy of the brake pad temperature is referred to as "estimation accuracy decline state" for convenience, when appropriate. What cases are defined as estimation accuracy decline states will be described in detail with reference to FIGS. 5 and 6.

If it is determined that the present state is not the estimation accuracy decline state (NO at S14), the ECU 200 computes an estimated temperature of the brake pad in order to execute the temperature-compensated control (S16). From the computed estimated temperature, the ECU 200 derives a temperature correction coefficient by using the pre-stored relationship between the estimated temperature of the brake pad and the temperature correction coefficient (see FIG. 3) (S18). By multiplying the uncorrected target pressure by this temperature correction coefficient, the ECU 200 computes a corrected target pressure (S20). Then, the ECU 200 controls the pressure-intensifying valves 40 and the pressure-reducing valves 42 so that each wheel cylinder pressure follows the corrected target pressure. Typically, the wheel cylinder pressure is feedback-controlled so that the deviation between the wheel cylinder pressure measured by the wheel cylinder pressure sensor 44 and the corrected target pressure is brought to zero. In consequence, the brake pad is pressed against the brake disc 22 in accordance with the wheel cylinder pressure, so that a braking force in accordance with target deceleration is applied to each wheel.

On the other hand, if it is determined that the present state is the estimation accuracy decline state (YES at S14), the ECU 200 determines whether or not the temperature correction coefficient derived during the immediately preceding computation cycle is greater than a reference value (S24). If the temperature correction coefficient is less than or equal to the reference value (NO at S24), the ECU 200 performs a control such that each wheel cylinder pressure follows the uncorrected target pressure (S22). Thus, the target hydraulic pressure is switched from the corrected target pressure computed in the immediately preceding computation cycle to the uncorrected target pressure. It is to be noted herein that the reference value is appropriately set so that the fluctuation of the effect of the brake caused by this switch will not be remarkable. In a concrete example, the reference value is set at, for example, 1.05. In that case, if the immediately preceding temperature correction coefficient is less than or equal to 1.05, that is, the increasing correction of the uncorrected target pressure was within 5%, the target hydraulic pressure is promptly switched from the corrected target pressure to the uncorrected target pressure.

Conversely, if the temperature correction coefficient exceeds the reference value (YES at S24), the ECU 200 computes an intermediate target pressure that is an intermediate value between the corrected target pressure and the uncorrected target pressure (S26), and performs a control such that each wheel cylinder pressure follows the intermediate target pressure (S22). The intermediate target pressure is worked out by multiplying the uncorrected target pressure by an intermediate correction coefficient that is obtained by decreasing the immediately preceding temperature correction coefficient to such an extent that the fluctuation of the effect of the brake will not be remarkable. The ECU 200 maintains the intermediate target pressure constantly throughout one braking operation, and further decreases it toward the uncorrected target pressure at the time of next braking. Or, the ECU 200 may also switch the target hydraulic pressure completely to the uncorrected target pressure at the time of next braking. In this manner, the ECU 200 decreases the corrected target pressure stepwise to the uncorrected target pressure at every braking. For example, if the temperature correction coefficient used in the immediately preceding computation cycle is 1.12, the ECU 200 decreases the intermediate correction coefficient stepwise, for example, to 1.07, 1.02, 1.00, at every braking. Instead of bringing the target pressure closer to the uncorrected target pressure at every braking, it is also permissible to makes a gradual switch from the temperature-compensated control to the non-temperature-compensated control in accordance with the elapsed time, the travel distance, etc.

Figure 5:
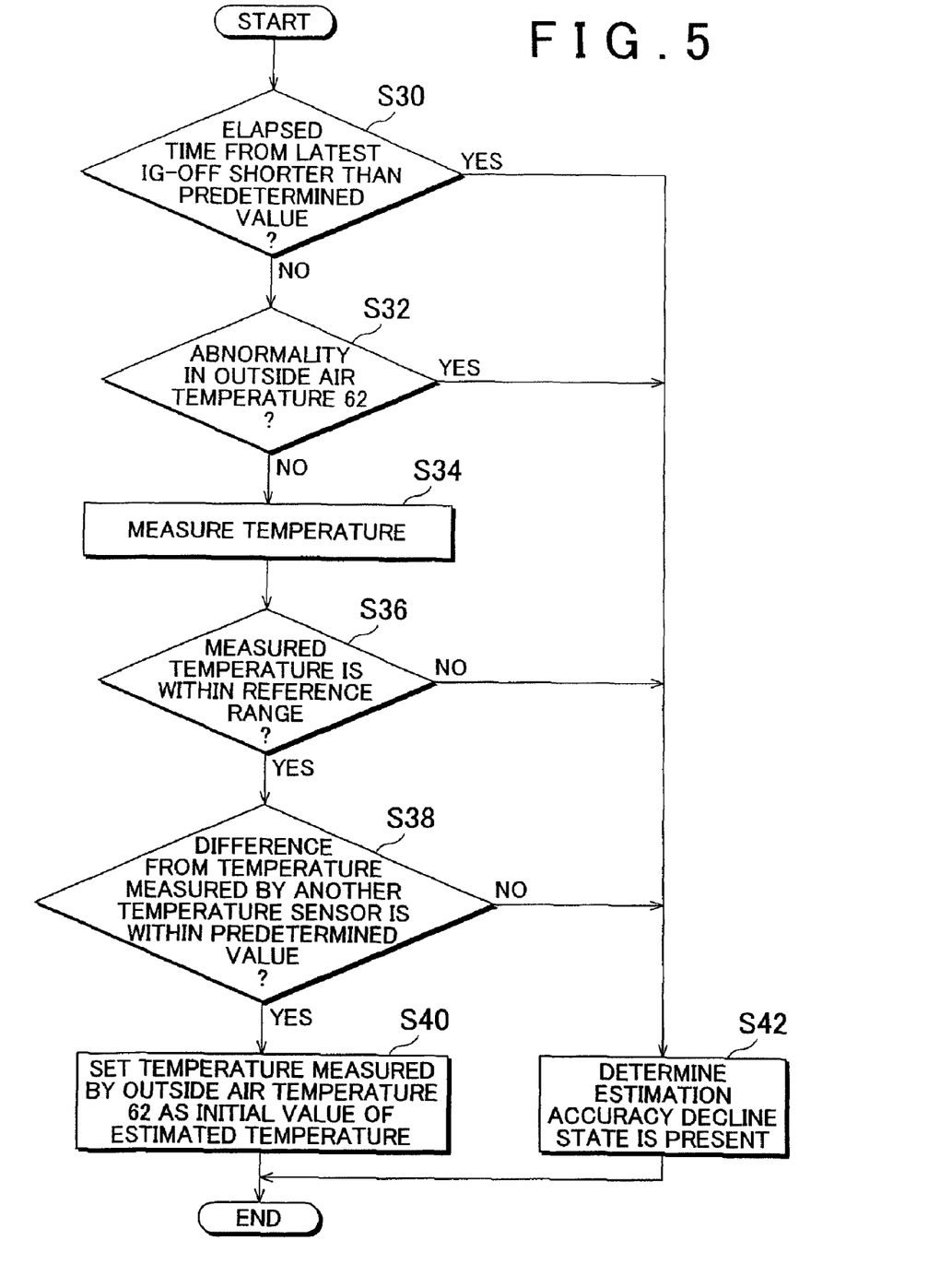
FIG. 5 is a flowchart for describing an example of a process for determining whether or not an estimation accuracy decline state is present in this embodiment.

Next, a determination process regarding the estimation accuracy decline state will be described. FIG. 5 is a flowchart for describing an example of a process for determining whether or not the estimation accuracy decline state is present in this embodiment. FIG. 5 shows a process for determining, as the estimation accuracy decline state, the case where the initial temperature value acquired at the time of beginning of the estimation of the brake pad temperature is predicted to be deviate from the actual friction member temperature. In this embodiment, the estimation of the brake pad temperature is begun at the time of startup of the vehicle-running drive source, and the value measured at the time of startup thereof by the outside air temperature sensor 62 is used as an initial temperature value for the brake pad temperature estimation. Therefore, the process shown in FIG. 5 is executed by the ECU 200 when the vehicle-running drive source is started, typically, when the ignition key is turned on (hereinafter, referred to as "IG-ON time" when appropriate).

When the process shown in FIG. 5 is started, the ECU 200 first determines whether or not the elapsed time following the latest stop of the vehicle-running drive source, typically, the time of the ignition key being turned off (hereinafter, referred to as "IG-OFF time" when appropriate) is shorter than a set predetermined time (S30). The elapsed time is measured by, for example, a timer built in the ECU 200, or the like. If it is determined that the elapsed time is shorter than the predetermined time (YES at S30), the ECU 200 determines that the estimation accuracy decline state is present (S42). It is preferable that the predetermined time be pre-set at, for example, a time that is needed for the brake pad heated to a maximum level during running of the vehicle to naturally cool to substantially the same level as the outside air temperature after the IG-OFF time. A reason for this is as follows. If a sufficient time has not elapsed following the previous IG-OFF time, there is a likelihood that the brake pad heated during the previous running of the vehicle has not cooled to substantially the same level as the outside air temperature. In such a case, the temperature measured by the outside air temperature sensor 62 is predicted to be deviate from the actual brake pad temperature, and it is not appropriate to use the temperature measured by the outside air temperature sensor 62 as an initial value of the estimated temperature.

If it is determined that the amount of time following the IG-OFF has exceeded the predetermined time (NO at S30), the ECU 200 determines whether or not there is an abnormality in the outside air temperature sensor 62 (S32). For example, it is determined that there is an abnormality in the outside air temperature sensor 62, in the case where there is a record of a signal indicating that a failure or the like occurred in the outside air temperature sensor 62 during a past run of the vehicle, and the failure has not been repaired. If it is determined that there is an abnormality in the outside air temperature sensor 62 (YES at S32), the ECU 200 determines that the estimation accuracy decline state is present (S42). This is because if the outside air temperature sensor 62 is in an abnormal state, for example, has a failure, it is not appropriate to use the temperature measured thereby as an initial value of the estimated temperature. Incidentally, the ECU 200 may also determine that the estimation accuracy decline state is present, if there is an abnormality in a sensor provided for measuring a different measurement value needed for the temperature estimation, for example, the wheel speed sensor 60, the wheel cylinder pressure sensor 44 or the like.

If it is determined that a signal indicating abnormality of the outside air temperature sensor 62 is not detected (NO at S32), the ECU 200 accepts a signal that indicates the temperature measured by the outside air temperature sensor 62 (S34). Although in the embodiment, the measured temperature used is the temperature measured once at the IG-ON time, an average value or the like of temperatures measured several times around the IG-ON time or after the IG-ON time may be used. In another possible construction, the determination process shown in FIG. 5 is executed for each of a plurality of measured values, and if it is determined that the estimation accuracy decline state is present a plurality of times instead of a single time, then it is firmly determined that the estimation accuracy decline state is present. This will further improve the accuracy of the determination.

Next, the ECU 200 determines whether or not the measured outside air temperature is within a reference range (S36). In the ECU 200, a temperature range that is considered to be a proper as the outside air temperature is set and stored beforehand as a reference range. The reference range is set on the basis of factors that affect the vehicle environment temperature, for example, the destination of the vehicle, the vehicle environment factors at the time of temperature measurement, etc. The vehicular environment factors at the time of temperature measurement are factors that can be supplied to the ECU 200 from the outside of the vehicle by wireless communication or the like. Concrete examples thereof include the location of the vehicle and the weather at the time of measurement, the date and hour of the measurement, etc. If it is determined that the temperature measured by the outside air temperature sensor 62 is not included in the reference range set as described above (NO at S36), it is considered that the measured temperature is not adequate due to a failure of the outside air temperature sensor 62 or the like, and therefore the ECU 200 determines that the estimation accuracy decline state is present (S42).

If it is determined that the temperature measured by the outside air temperature sensor 62 is included in the reference range (YES at S36), the ECU 200 further determines whether or not the difference between the temperature measured by the outside air temperature sensor 62 and the temperature measured by another temperature sensor is less than or equal to a predetermined value (S38). In this embodiment, the another temperature sensor is the engine water temperature sensor 64. By comparing the values measured by a plurality of temperature sensors that are considered to exhibit substantially the same temperature at the IG-ON time, the adequacy of the temperature measured by the outside air temperature sensor 62 can be determined. Therefore, the predetermined value herein is set as a threshold value so that the values measured by the temperature sensors can be considered to be substantially the same for the purpose of determining the adequacy. A reason why there are differences in the measured value among the temperature sensors is, for example, that the elapsed time from the IG-OFF time is short. If the elapsed time from the IG-OFF is short, there is likelihood that the engine water temperature has not sufficiently dropped approximately to the outside air temperature. Therefore, it is determined that the difference between the temperatures measured by the outside air temperature sensor 62 and the engine water temperature sensor 64 exceeds the predetermined value (NO at S38), the ECU 200 determines that the estimation accuracy decline state is present (S42).

Incidentally, instead of the engine water temperature sensor 64, a different temperature sensor, such as an intake air temperature sensor or the like, may be used. Or, a predetermined value having a correlation with the measured temperature, for example, the engine idle rotation speed having a correlation with the engine water temperature, can be used instead.

If it is determined that the difference between the temperatures measured by the outside air temperature sensor 62 and the engine water temperature sensor 64 is less than or equal to a predetermined value (YES at S38), the ECU 200 sets the temperature measured by the outside air temperature sensor 62 as an initial value of the brake pad temperature estimation (S40), and ends this process. In the process described above, the outside air temperature measured is used as an initial value of the estimated temperature in the case where all the determination conditions (S30, S32, S36, S38) are satisfied. Instead of this, it may be in the case where any one or more of the determination conditions are satisfied that the outside air temperature measured is used as an initial value of the estimated temperature. Besides, one or more of the aforementioned determination conditions can be omitted in the process.

After the process ends, the ECU 200 may set an allowable fluctuation width that includes the measured temperature used as an initial value of the temperature estimation, for the values measured by the outside air temperature sensor 62. In this case, if the value measured by the outside air temperature sensor 62 from that time on exceeds the allowable fluctuation width, the ECU 200 determines that the outside air temperature sensor 62 is abnormal, and substantially prevents the temperature measured by the outside air temperature sensor 62 from being used for the temperature estimation. This is because it is considered that the fluctuation width of the outside air temperature is generally not so large. Furthermore, an allowable fluctuation width may also be set for the time-dependent rate of change of the outside air temperature as well as the measured temperature.

As mentioned above, the value measured by the outside air temperature sensor 62 is used in the computation of the cooling temperature loss used for computing the estimated pad temperature. Therefore, if an abnormality of the outside air temperature sensor 62 is detected, the outside air temperature obtained before the abnormality is detected may be used in the computation of the cooling temperature loss. In this case, if the temperature gain of the pad is fictitiously regarded as zero, then the estimated pad temperature gradually converge to the outside air temperature detected prior to the detection of the abnormality. This also makes a gentle switch from the temperature-compensated control to the non-temperature-compensated control.

Figure 6:
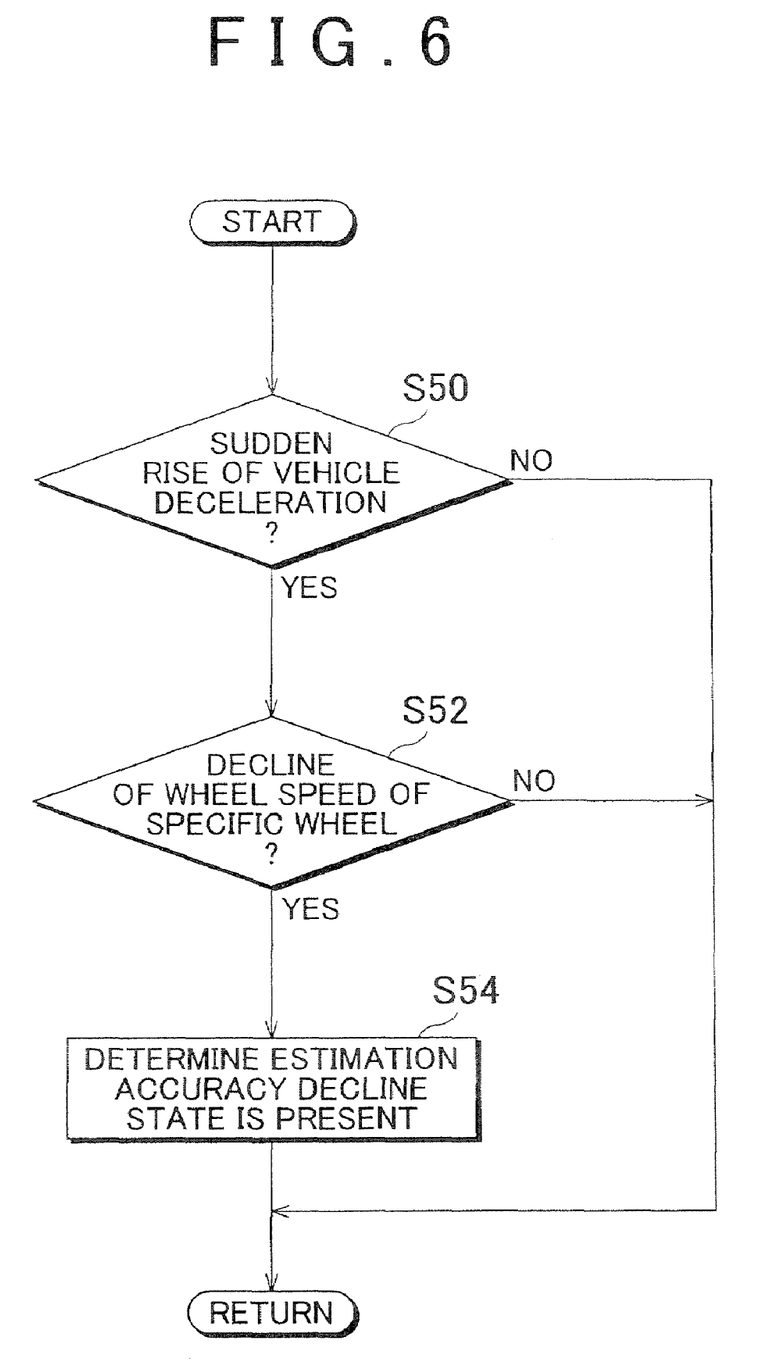
FIG. 6 is a flowchart for describing another example of the process for determining whether or not the estimation accuracy decline state is present in this embodiment.

FIG. 6 is a flowchart for describing another example of the process for determining whether or not the estimation accuracy decline state is present in this embodiment. FIG. 6 shows a process for determining whether or not the estimation accuracy decline state is present on the basis of a change in an index that indicates the braking force, such as the vehicle deceleration or the like if the brake pad temperature suddenly declines during the running of the vehicle due to an external disturbance such as water or snow submergence of the wheels, strong wind, etc. The process shown in FIG. 6 is executed on a predetermined cycle, for example, every several milliseconds, from the IG-ON time to the IG-OFF time.

When the process shown in FIG. 6 is started, the ECU 200 first determines whether or not the vehicle deceleration has suddenly risen, that is, whether or not the vehicle deceleration has suddenly increased beyond the predetermined time-dependent rate of change (S50). This is because if the brake pad temperature suddenly declines due to an external disturbance such as water submergence or the like, the braking force suddenly increases, so that the vehicle deceleration suddenly rises. The predetermined time-dependent rate of change of the vehicle deceleration is set on the basis of the time-dependent rate of change of the brake pad temperature that is assumed for the case where there is not such an external disturbance as water submergence or the like, and basically is set so that the assumed rate of change of the pad temperature is exceeded. The thus-set predetermined time-dependent rate of change may be set as a uniform value, or may also be set variably in accordance with the pad temperature or the like. Incidentally, the vehicle deceleration is measured by, for example, a G sensor mounted in the vehicle.

If a sudden rise of the vehicle deceleration is not detected (NO at S50), the ECU 200 ends the process, and starts the process again at the next execution timing. Instead of the vehicle deceleration, a sudden decline of the wheel speed may be detected. On the other hand, if a sudden rise of the vehicle deceleration is detected (YES at S50), the ECU 200 further determines whether or not the wheel speed of a specific one of the four wheels of the vehicle has declined relative to the wheel speeds of the other wheels (S52). This is because if a wheel experiences submergence or the like, the wheel becomes apt to be locked. If a decline in the speed of a specific wheel is not detected (NO at S52), the ECU 200 ends the process, and starts the process again at the next execution timing. If a decline in the speed of a specific wheel is detected (YES at S52), the ECU 200 determines that the estimation accuracy decline state is present (S54).

Incidentally, the determination condition related to a decline in the speed of a specific wheel may be omitted, and the ECU 200 may determine whether or not the estimation accuracy decline state is present, solely from a determination condition related to a sudden rise in the vehicle deceleration. The ECU 200 may also determine whether or not the estimation accuracy decline state is present by using, in combination with the aforementioned determination conditions, weather information as a vehicle environment factor, information indicating the state of action of the windshield wipers and the like mounted on the vehicle, or information indicating the weather in the environment of the vehicle, such as a signal from a rain drop sensor or the like.

Furthermore, as a condition for the ECU 200 to determine that the estimation accuracy decline state is present, it is also possible to include the case where during the running of the vehicle, an abnormality occurs in a sensor provided for measuring the measurement value needed for computation of the estimated temperature. Examples of the sensor for measuring a measurement value needed for computation of the estimated temperature include the outside air temperature sensor 62, the wheel speed sensor 60, etc. Furthermore, the presence of the estimation accuracy decline state may also be determined in the case where an abnormality is detected in another sensor such as the engine water temperature sensor 64, the G sensor, etc. Or, the presence of the estimation accuracy decline state may also be determined in the case where the difference between an index indicating the effectiveness of the brake estimated from the vehicle deceleration, the wheel cylinder pressure, etc., and an index indicating the effectiveness of the brake predicted on the basis of the estimated pad temperature is large.

Furthermore, the ECU 200 may also determine that the estimation accuracy decline state is present, in the case where the vehicle is running with the parking brake being on. This is because if the vehicle runs with the barking brake being on, heat flows from the parking brake into the brake pad. In this case, a temperature gain of the brake pad caused by the parking brake may be estimated by computing the amount of heat generated by the parking brake on the basis of the deceleration caused by the parking brake, and may be factored into the estimated temperature of the brake pad. This will restrain the decline of the estimation accuracy of the brake pad temperature even if the vehicle runs with the parking brake being on.

Figure 7:
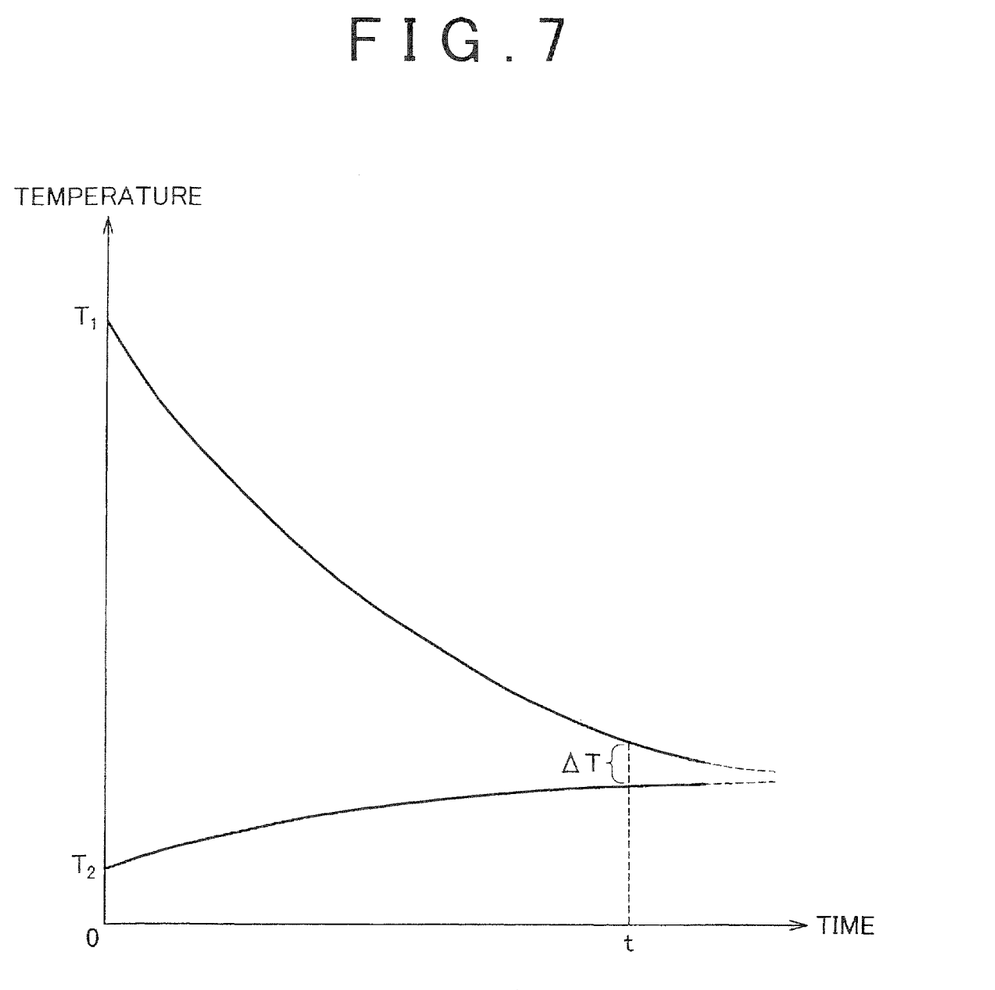
FIG. 7 is a diagram for describing a determination process regarding recovery of the estimation accuracy in the embodiment.

FIG. 7 is a diagram for describing a determination process regarding recovery of the estimation accuracy in the embodiment. In FIG. 7, the vertical axis represents the temperature, and the horizontal axis represents the elapsed time. In FIG. 7, it is assumed that at a time 0, the ECU 200 determines that the estimation accuracy decline state is present. At the time 0, the ECU 200 determines that the estimation accuracy decline state is present, and sets two initial temperature values $T_1$, $T_2$. The ECU 200 sets the initial temperature value $T_1$, $T_2$ so that the difference therebetween is larger than a present recovery criterion value $\Delta T$. Then, the ECU 200 starts to compute an estimated brake pad temperature by using the two initial temperature values $T_1$, $T_2$. When a difference between the estimated temperature computed with the temperature $T_1$ used as an initial value, and the estimated temperature computed with the temperature $T_2$ used an initial value reaches a recovery criterion value $\Delta T$ (at a time t in FIG. 7), the ECU 200 determines that the estimation accuracy has been recovered, and discontinues the restriction of the utilization of the estimated temperature. The estimated temperature is considered to converge irrespective of the initial value as the computation is repeatedly performed. Therefore, when the difference between the two estimated temperature values reaches the set recovery criterion value $\Delta T$, it can be determined that the estimation accuracy has been recovered. Due to this, the control is re-switched from the non-temperature-compensated control to the temperature-compensated control. Thus, it becomes possible to restrain the fluctuations of the effect of the brake caused by temperature changes of friction members. The switch from the non-temperature-compensated control to the temperature-compensated control may be promptly made, or may also be gently made via an intermediate target value as in the case described above with reference to FIG. 4.

One of the two initial temperature values $T_1$, $T_2$ may be set at an estimated temperature occurring immediately prior to the determination of the presence of the estimation accuracy decline state, and the other value may be a temperature value that is appropriately set. Or, it is also permissible to appropriately set both the initial temperature values $T_1$, $T_2$. If the difference between the two initial temperature values is smaller, the computed estimated temperature value will sooner converge and the utilization restriction thereof can be sooner discontinued. On the other hand, if the difference therebetween is larger, the recovery of the estimation accuracy can be determined with higher accuracy. Therefore, the setting of the initial temperature value cannot be uniformly determined, and it is preferable that the initial temperature value be appropriately set in accordance with design requirements. Similarly, it is preferable that the recovery criterion value ΔT be appropriately determined in accordance with the initial temperature value.

Concrete examples will be cited herein. If it is determined that the estimation accuracy decline state is present because the elapsed time following the latest IG-OFF is shorter than a set time, the initial temperature value $T_1$ may be set at, for example, 500° C. as an assumed maximum value and the initial temperature value $T_2$ may be set at the outside air temperature. If it is determined that the estimation accuracy decline state is present because the vehicle has run with the parking brake being on, the initial temperature value $T_1$ is set at 300° C. as an assumed maximum value and, as for the initial temperature value $T_2$, the immediately preceding estimated temperature may be used to continue the temperature estimation. At the time of submergence, the initial temperature value T1 may be set at the outside air temperature, and, as for the initial temperature value T2, the immediately preceding estimated temperature is used to continue the temperature estimation.

If an abnormality occurs in the outside air temperature sensor 62, the temperature estimation may continue to be performed by using the outside air temperature detected at the time of occurrence of the abnormality. Then, when the outside air temperature sensor 62 becomes normal, the computation of the second estimated temperature may be started. When the difference between the two estimated temperatures becomes smaller than the recovery criterion value ΔT, the ECU 200 may determine that the accuracy has been recovered. If an abnormality occurs in the wheel cylinder pressure sensor 44, the wheel speed sensor 60, or the like, the initial temperature value $T_1$ is set at 500° C. as an assumed maximum value, and, as for the initial temperature value $T_2$, the immediately preceding estimated temperature may be used to continue the temperature estimation.

As described above, according to the embodiment, the ECU 200 restricts the utilization of the estimated temperature in the computation of a target pressure if there is predicted to be a decline of the estimation accuracy of the brake pad temperature. This makes it possible to restrain the influence of decline of the estimation accuracy on the braking force control, and to further stabilize the effectiveness of the brake. Besides, while restricting the utilization of the estimated temperature, the ECU 200 determines whether or not the accuracy of the temperature estimation has been recovered. If it is determined that the accuracy has been recovered, the ECU 200 discontinues the restriction of utilization of the estimated temperature. Therefore, the utilization of the estimated temperature can be started again upon recovery of the estimation accuracy, so that the fluctuations in the effect of the brake caused by temperature changes of the brake pad can be restrained. Thus, according to the embodiment, it is possible to stabilize the effectiveness of the brake by properly correcting the braking force in accordance with whether or not the estimation accuracy of the brake pad temperature is secured.

In addition, although in the embodiment, an estimated value is used as a brake pad temperature for correction, an actually measured value of the brake pad temperature may be used. Specifically, the brake control apparatus may comprise: a braking force applying mechanism that brakes a wheel by pressing a friction member; a control portion that computes a target value set for controlling the pressurizing force of the friction member by utilizing the temperature of a friction member so as to restrain fluctuations of the effect of the brake caused by temperature changes of the friction member, wherein the control portion may restrict the utilization of the measured temperature in the computation of the target value in a predetermined case where there is predicted to be a decline of the measurement accuracy of the member temperature. With this construction, the utilization of the measured temperature is also restricted, so that the influence of the measured temperature on results of computation of target values can be lessened. Therefore, it becomes possible to restrain the influence on the braking force control exerted by decline of the measured temperature, and to further stabilize the effectiveness of the brake.

At this time, the control portion may compute a corrected target value by correcting the uncorrected target value computed without utilizing a measured temperature, in accordance with the measured temperature, and may control the pressurizing force of the friction member by using the corrected target value, and may control the pressurizing force of the friction member by using the uncorrected target value instead of the corrected target value in a predetermined case where there is predicted to be a decline of the measurement accuracy of the friction member temperature.

What is claimed is:

1. A vehicle brake control apparatus comprising:
   a braking force application mechanism that brakes a wheel by pressurizing a friction member; and
   a control portion that computes a target value to control a pressurizing force of the friction member, on a basis of an estimated temperature of the friction member,
   wherein the control portion predicts an accuracy of the estimated temperature of the friction member based on at least one of vehicular operational information and vehicular environmental information associated with the temperature of the friction member, and
   wherein the control portion restricts utilization of the estimated temperature of the friction member in computing the target value when a decline of the accuracy of the estimated temperature of the friction member is predicted.

2. The brake control apparatus according to claim 1, wherein, when a decline of the accuracy of the estimated temperature of the friction member is not predicted, the control portion computes a corrected target value by correcting an uncorrected target value, computed without utilizing the estimated temperature, in accordance with the estimated temperature, and controls the pressurizing force of the friction member by using the corrected target value, and
   wherein, when a decline of the accuracy of the estimated temperature of the friction member is predicted, the control portion controls the pressurizing force of the friction member using the uncorrected target value instead of the corrected target value.

3. The brake control apparatus according to claim 2, wherein, when using the uncorrected target value instead of the corrected target value, the control portion gradually switches from the corrected target value to the uncorrected target value.

4. The brake control apparatus according to claim 1, wherein a decline of accuracy of the estimated temperature of the friction member is predicted when an initial temperature value, acquired when temperature estimation of the friction member is started, is predicted to deviate from an actual friction member temperature.

5. The brake control apparatus according to claim 4, wherein the control portion determines whether there is predicted to be a deviation of the initial temperature value from the actual friction member temperature by acquiring, as the initial temperature value, a measured value provided by one of at least two temperature sensors mounted in a vehicle, and comparing the initial temperature value and a measured value provided by another one of the temperature sensors.

6. The brake control apparatus according to claim 1, wherein a decline of accuracy in the estimated temperature of the friction member is predicted when a time-dependent rate of change of the friction member temperature exceeds a predetermined value.

7. The brake control apparatus according to claim 6, wherein the control portion determines whether the time-dependent rate of change of the friction member temperature exceeds the predetermined value based on an index that indicates a magnitude of braking force generated by the braking force applying mechanism.

8. The brake control apparatus according to claim 1, wherein a decline of accuracy in the estimated temperature of the friction member is predicted when an abnormality occurs in a sensor that provides a measured value that is needed for computing the estimated temperature of the friction member.

9. The brake control apparatus according to claim 1, wherein the control portion, while restricting the utilization of the estimated temperature, determines whether an accuracy of the estimated temperature has been recovered, and
wherein, if the control portion determines that the accuracy of the estimated temperature has recovered, the control portion discontinues restricting the utilization of the estimated temperature.

10. The brake control apparatus according to claim 9, wherein the control portion, when starting restricting the utilization of the estimated temperature, starts estimating the temperature of the friction member from each of two initial temperature values that have a difference that is greater than a recovery criterion value, and
wherein the control portion determines that the accuracy of the estimated temperature has recovered when the difference between two detected temperatures, derived respectively from the two initial temperature values, becomes smaller than the recovery criterion value.

11. A method for controlling braking force of a vehicle having a braking force applying mechanism that brakes a wheel by pressurizing a friction member, comprising the steps of:
estimating a temperature of the friction member,
computing a target value to control a pressurizing force of the friction member, on a basis of the estimated temperature of the friction member,
predicting an accuracy of the estimated temperature of the friction member based on at least one of vehicular operational information and vehicular environmental information associated with the temperature of the friction member, and
restricting utilization of the estimated temperature of the friction member in computing the target value when a decline of the accuracy of the estimated temperature of the friction member is predicted.

12. The method according to claim 11, wherein:
when a decline of the accuracy of the estimated temperature of the friction member is not predicted, a corrected target value is computed by correcting an uncorrected target value, computed without utilizing the estimated temperature, in accordance with the estimated temperature, and the pressurizing force of the friction member is controlled by using the corrected target value; and
when a decline of the accuracy of the estimated temperature of the friction member is predicted, the pressurizing force of the friction member is controlled using the uncorrected target value instead of the corrected target value.

13. The method according to claim 12, wherein, when using the uncorrected target value instead of the corrected target value, a gradual switch is made from the corrected target value to the uncorrected target value.

14. The method according to claim 11, wherein a decline of accuracy of the estimated temperature of the friction member is predicted when an initial temperature value, acquired when temperature estimation of the friction member is started, is predicted to deviate from an actual friction member temperature.

15. The method according to claim 14, wherein a deviation of the initial temperature value from the actual friction member temperature is predicted by acquiring, as the initial temperature value, a measured value provided by one of at least two temperature sensors mounted in a vehicle, and comparing the initial temperature value and a measured value provided by another one of the temperature sensors.

16. The method according to claim 11, wherein a decline of accuracy in the estimated temperature of the friction member is predicted when a time-dependent rate of change of the friction member temperature exceeds a predetermined value.

17. The method according to claim 16, wherein it is determined whether or not the time-dependent rate of change of the friction member temperature exceeds the predetermined value based on an index that indicates a magnitude of braking force generated by the braking force applying mechanism.

18. The method according to claim 11, wherein a decline of accuracy in the estimated temperature of the friction member is predicted when an abnormality occurs in a sensor that provides a measured value that is needed for computing the estimated temperature of the friction member.

19. The method according to claim 11, further comprising:
while restricting the utilization of the estimated temperature of the friction member in computing the target value, determining whether the accuracy of the estimated temperature has recovered, and
wherein if the accuracy of the estimated temperature has recovered, the utilization of the estimated temperature of the friction member in computing the target value is no longer restricted.

20. The method according to claim 19, wherein, when starting restricting the utilization of the estimated temperature, a temperature from each of two initial temperature values that have a difference that is greater than a recovery criterion value is detected, and
wherein the accuracy of the estimated temperature has recovered when the difference between two detected temperatures, derived respectively from the two initial temperature values, becomes smaller than the recovery criterion value.

* * * * *